United States Patent

Spies

[15] 3,645,580
[45] Feb. 29, 1972

[54] WHEEL FOR TWO-WHEEL VEHICLES

[72] Inventor: Helmut Spies, Schweinfurt am Main, Germany

[73] Assignee: Fichtel & Sachs AG, Schweinfurt am Main, Germany

[22] Filed: Feb. 16, 1970

[21] Appl. No.: 11,507

[30] Foreign Application Priority Data

Feb. 15, 1969 Germany..................P 19 07 721.5

[52] U.S. Cl..............................301/55, 301/105 B, 301/59, 192/6
[51] Int. Cl......................................................B60b 24/07
[58] Field of Search.................301/6 V, 55, 59, 105 B, 9 CN; 192/6

[56] References Cited

UNITED STATES PATENTS

| 2,994,560 | 8/1961  | Carlson  | 301/59     |
| 2,525,219 | 10/1950 | Green    | 301/59 X   |
| 726,103   | 4/1903  | Schacht  | 301/9 CN X |
| 2,357,188 | 8/1944  | English  | 301/105 B  |

FOREIGN PATENTS OR APPLICATIONS

| 115,153 | 5/1918 | Great Britain | 301/6 V |

*Primary Examiner*—Richard J. Johnson
*Attorney*—Kelman & Berman

[57] ABSTRACT

Wheels for two-wheel vehicles, e.g., bicycles and motorcycles, include a hub sleeve and a rim, said hub sleeve and said rim being connected by a plurality of radially extending spokes attached to a spoke attachment sleeve releasably mounted on said hub sleeve.

11 Claims, 6 Drawing Figures

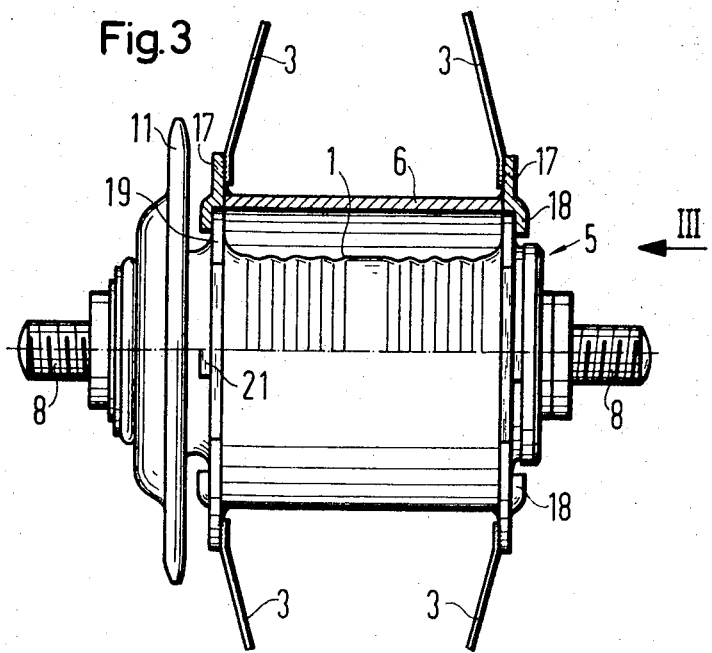
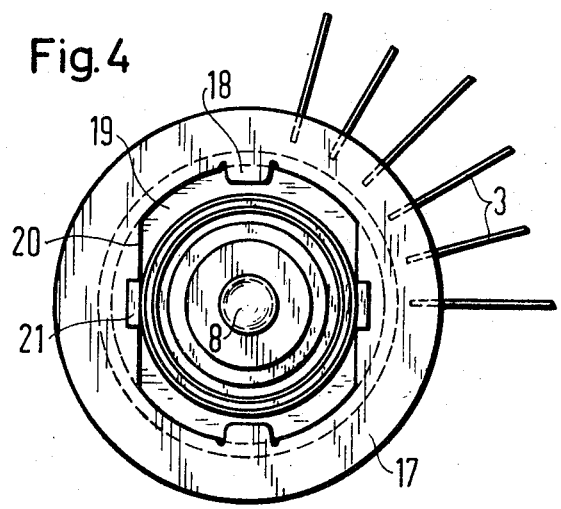

Patented Feb. 29, 1972  3,645,580

WHEEL FOR TWO-WHEEL VEHICLES

This invention relates to wheels for two-wheel vehicles, e.g., bicycles and motorcycles and to hubs for such wheels.

The hubs are frequently manufactured at a place different from the place at which the hubs are to be combined with the remaining parts of the wheel. The mounting of the hub in the wheel is complicated and time consuming; this is true for the one method according to which the completely mounted hub is at another place mounted in the wheel, as well as for the other method according to which the hub sleeve is already mounted in the wheel and the remaining parts of the hub are to be inserted into the hub sleeve.

The primary object of the invention is the provision of a wheel which allows a simplified method of combining a premounted hub with the equally premounted remainder of the wheel, i.e., the unit comprising the rim and the spokes.

With this object in view the wheel of this invention provides a spoke attachment sleeve connected to the radially inner ends of the spokes and releasably fixed to the hub sleeve of the hub.

A further object of this invention is the provision of a hub which is adapted for being mounted into a premounted unit comprising the rim and the spokes.

With this object in view the hub of this invention comprises a hub sleeve with fixing means for releasably fixing a spoke attachment sleeve which is connected to the radially inner ends of a plurality of spokes.

A further object of this invention is to provide a hub which can be used both in connection with wheels of this invention and also in connection with usual wheels.

With this object in view the hub of this invention comprises a sleeve which is adapted to be either mounted in a spoke attachment sleeve of this invention or alternatively to be provided with usual spoke attachment flanges.

Other features, additional objects, and many of the attendant advantages of this invention will be readily appreciated as the same becomes better understood by reference to the following detailed description of preferred embodiments when considered in connection with the accompanying drawings in which:

FIG. 3 shows the central part of a wheel of this invention, partly in section;

FIG. 4 shows a view of the wheel of FIG. 3 when regarded in a direction of arrow III of FIG. 3;

Figure 1:
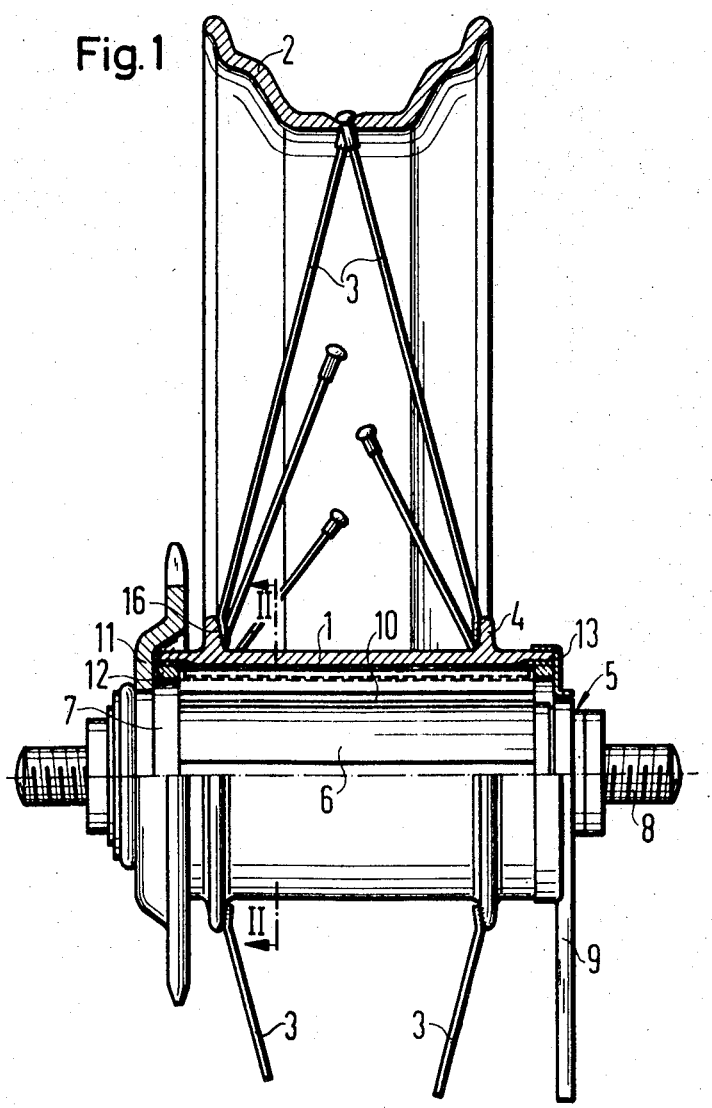
FIG. 1 shows a wheel of this invention, partly in section along the axis of the wheel.
Figure 2:
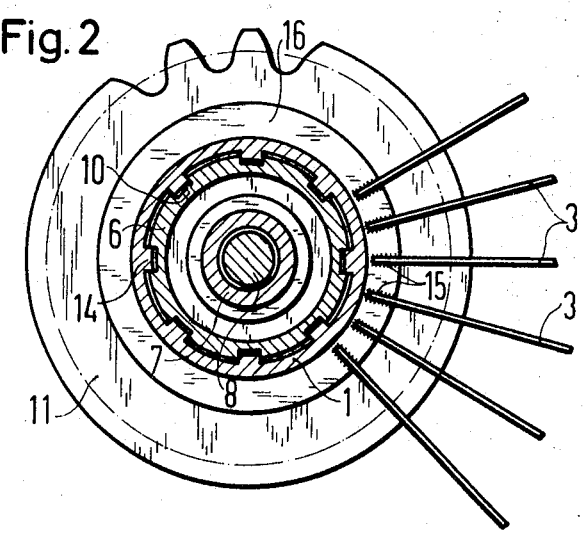
FIG. 2 shows a section on the line II—II of FIG. 1.

In the embodiment of FIG. 1 the wheel comprises a spoke attachment sleeve 1 which is connected by wire spokes 3 with a rim 2; the spokes 3 are connected to side faces 16 of spoke attachment flanges 4 by welding. The welding seams are designated by the reference numeral 15. A hub 5 is inserted into the spoke attachment sleeve 1. The hub 5 comprises a hub shaft 8 and a hub sleeve 6. The hub is secured in axial direction by annular nuts 12 threaded into the ends of the spoke attachment sleeve 1. An input sprocket 11 is mounted on a driving member 7 which is part of driving motion-transmitting means inside the hub sleeve 6. At the end of the hub which is remote from the input sprocket 11 there is provided a brake lever 9. The motion-transmitting means inside the hub sleeve 6 will be described in more detail in connection with FIG. 5. Annular caps 13 are provided at the axial ends of the spoke attachment sleeve 1. These annular caps partly cover the ends of the hub 5.

For torque transmission from the hub sleeve 6 to the spoke attachment sleeve there are provided axially extended grooves 10 on the hub sleeve 6. Corresponding projections 14 of the spoke attachment sleeve 1 engage these grooves. The torque is transmitted from the input sprocket 11 via the driving member 7, the motion-transmitting means inside the hub sleeve, the hub sleeve 6, the interengaging grooves 10, and projections 14 to spoke attachment sleeve 1.

In the embodiment of FIG. 3 and FIG. 4 the hub sleeve 6 of the hub 5 is provided with two flanges 19 having two plane faces 20. The spoke attachment sleeve 1 is provided with end disks 17 which are provided with a profile adapted to receive the flanges 19 so that, when the hub 5 is inserted into the spoke attachment sleeve 1, the hub sleeve 6 is nonrotatably fixed in the spoke attachment sleeve 1. For preventing axial movement of the hub 5 with respect to the spoke attachment sleeve 1 there are provided lugs 18 at the end disks 17, which lugs can be bent after inserting the hub 5 so as to abut the flanges 19 in axial direction. Further lugs 21 are provided at the end disks 17. These lugs 21 are bent into axial direction so as to increase the torque-transmitting face of the end disks 17.

Figure 5:
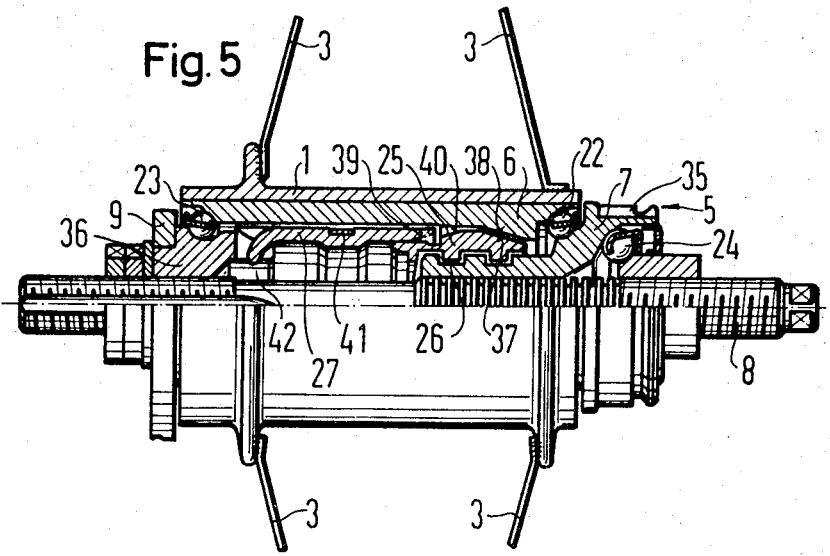
FIG. 5 shows a central part of a third embodiment of a wheel of this invention, partly in section.

In the embodiment of FIG. 5 the spoke attachment sleeve 1 is pressed over the hub sleeve 6 so as to be in frictional engagement with the hub sleeve. One set of spokes 3 in this embodiment is welded to the cylindrical outer face of the spoke attachment sleeve 1.

FIG. 5 further shows motion-transmitting means within the hub 5. These motion-transmitting means comprise a driving member 7 adapted at 35 to be combined with an input sprocket as shown at 11 in FIG. 1. This driving member 35 is rotatably mounted on the hub shaft 8 by a ball bearing 24. The hub sleeve 6 is rotatably mounted with its one end by a ball bearing 22 on the driving member 7 and with its other end by a ball bearing 23 on an annular member 36. On the driving member 7 an annular coupling member 25 is mounted by means of a screw connection 26. The annular coupling member 25 is in connection with the hub shaft 8 by frictional brake means (not shown). The annular coupling member 25 is provided with a first outer conical face 37 which is arranged opposite an inner conical face 38 of the hub sleeve 6. If the driving member is rotated in the forward sense the annular coupling member 25 is screwed to the right in FIG. 5 so that the first outer conical face 37 comes into frictional engagement with the inner conical face 38 of the hub sleeve 6 and the hub sleeve 6 is coupled to the driving member 7.

Further, there is provided a split braking member 27 inside the hub sleeve 6. This braking member 27 is provided with an inner conical face 39 opposite a second outer conical face 40 of the annular coupling member 26. The split braking member 27 is biased into a contracted position by an annular spring 41 and is supported by engagement at 42 with the annular member 36. The annular member 36 is provided with the brake lever 9 as illustrated in FIG. 1, which brake member has the function of securing the annular member 36 with respect to the bicycle frame (not shown).

When the driving member 7 is rotated in the backward sense the annular coupling member 25 is screwed to the left so that the second outer conical face 40 engages the inner conical face 39 of the split braking member 27. The split braking member 27 is thereby expanded and comes with its outer face into frictional engagement with the inner face of the hub sleeve 6; so the rotational movement of the hub sleeve 6 is braked.

Figure 6:
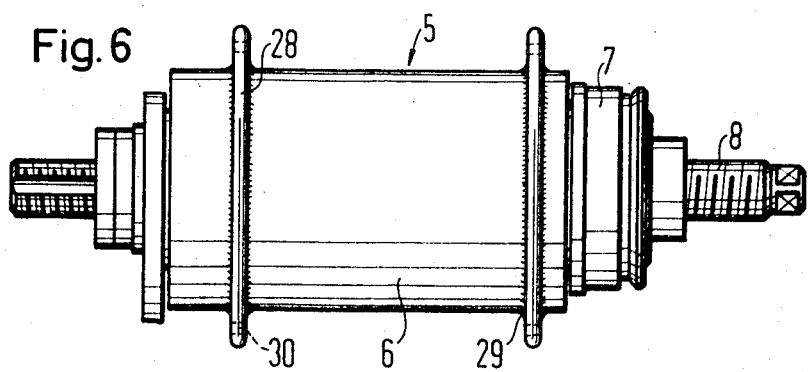
FIG. 6 shows a hub of this invention which has been provided with usual spoke attachment flanges.

In the embodiment of FIG. 6 there is again shown the hub 5 of FIG. 5. There is, however, no spoke attachment sleeve mounted on the hub sleeve 6. Instead of the spoke attachment sleeve there are provided spoke attachment flanges 28 by welding seems 29. The spoke attachment flanges 28 are provided with the usual spoke attachment bores 30.

This invention shall not be limited to the embodiment cited by way of example in the present specification, buy may be modified in any way within the scope of the basic idea of the present invention.

What is claimed is:

1. In a wheel for a bicycle and like two-wheel vehicle including a shaft having an axis, a hub mounted on the shaft for rotation about said axis, a rim, said hub including a hub sleeve coaxial with said shaft, an input member rotatably mounted on said shaft, a portion of said input member extending outside said hub sleeve, motion-transmitting means for transmitting torque between said input member and said hub sleeve, said motion transmitting means being enclosed in said hub, and a plurality of elongated spokes having each a longitudinal end portion connected to said rim, and attaching means attaching the other end portion of each spoke to said hub sleeve, the improvement in said attaching means which comprises:
  a. a spoke attachment sleeve connected to said other end portion of each spoke,
    1. said hub sleeve having an outer face and said spoke attachment sleeve having an inner face enveloping said outer face;
  b. a plurality of axially elongated ribs on each of said faces, the ribs on each face defining a plurality of grooves therebetween and being received in grooves between ribs on the other face;
  c. an axially terminal portion of one of said sleeves axially projecting beyond the other sleeve,
    1. the projecting portion of said one sleeve being threaded; and
  d. a securing ring threadedly engaging said threaded portion and axially abutting against said other sleeve,
    1. said spoke attachment sleeve being the sole element of said wheel capable of transmitting torque between said hub sleeve and said spokes.

2. In a wheel as set forth in claim 1, said ribs and grooves extending in an axial direction over at least a major part of the length of said hub sleeve and said spoke attachment sleeve.

3. In a wheel as set forth in claim 1, said motion-transmitting means comprising a multispeed gear system.

4. In a wheel as set forth in claim 3, said motion-transmitting means further comprising a back-pedalling brake.

5. In a wheel as set forth in claim 1, said one sleeve being said spoke attachment sleeve.

6. In a wheel as set forth in claim 5, the spokes being wire-members.

7. In a wheel as set forth in claim 5, the other axially terminal portion of said spoke attachment sleeve projecting beyond said hub sleeve in a direction opposite to the direction in which said one axially terminal portion projects, another securing ring threadedly engaging said other axially terminal portion and axially abutting against said hub sleeve.

8. In a wheel as set forth in claim 7, said axially terminal portions of said spoke attachment sleeve being internally threaded, and said hub sleeve having two radial end faces respectively abuttingly engaged by said securing rings.

9. In a wheel as set forth in claim 8, the spokes being fixed to said spoke attachment sleeve by welding or brazing.

10. In a wheel as set forth in claim 9, the spokes being fixed to a radially extending spoke attachment flange of said spoke attachment sleeve.

11. In a wheel as set forth in claim 8, an annular cap extending radially inward from an axial end of said spoke attachment sleeve and partly coextensive with said hub sleeve in an axial direction.

* * * * *